United States Patent Office 3,595,720
Patented July 27, 1971

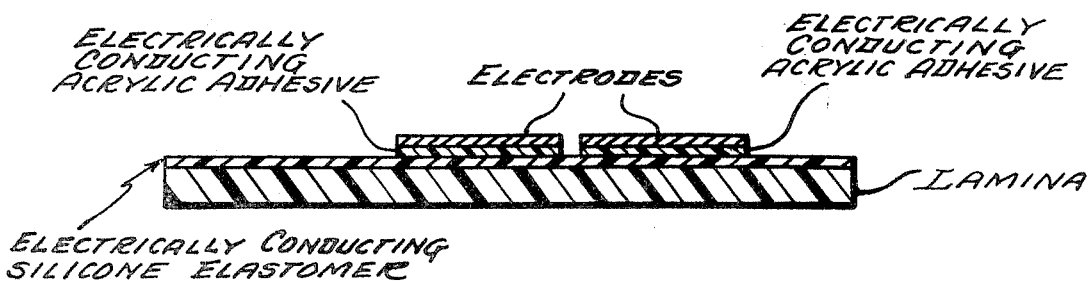

3,595,720
HEATING ELEMENTS
Jack Ames, Troon, and Thomas Gilmour Graham, Stevenson, Scotland, assignors to Imperial Chemical Industries Limited, London, England
Filed Oct. 9, 1967, Ser. No. 673,949
Claims priority, application Great Britain, Oct. 20, 1966, 46,920/66
Int. Cl. H01b 13/06
U.S. Cl. 156—51          3 Claims

ABSTRACT OF THE DISCLOSURE

A process for the production of an electric heating element comprising applying to a coating of an electrically conducting silicone elastomer coated on at least one side of a lamina selected from the group consisting of woven, knitted, felted fabrics and film at least two electrodes coated with an electrically conducting acrylic adhesive and applying pressure whereby said electrodes become firmly attached to the said coating, said electrodes being selected from metal foil, gauze, braid and wire applied to the coating on the same side of the lamina.

---

This invention relates to heating elements and more particularly to such elements based on the use of an electrically conducting surface as the source of heat.

A variety of heating elements are known or have been proposed in which a lamina coated with an electrically conducting composition and provided with two electrodes which can be connected to a source of electric power is used as the source of heat. These elements may be rigid or flexible depending on the materials used, and the nature and form of the lamina. In many such elements the lamina is formed of glasscloth, but other materials such as film, or woven, knitted or felted fabrics, for example, of nylon, polyethylene terephthalate, cellulose or asbestos can also be used. The choice of material for the lamina will depend in many cases on the operating temperature and on the use to which the heating element is to be put.

A wide variety of materials have also been used to form the electrically conducting coating including, for example, natural and synthetic rubbers or elastomers rendered electrically conducting by the inclusion therein of a proportion of metal or carbon particles and metal film deposited on the lamina by painting or spraying. Among the synthetic elastomers which have been used are the silicone elastomers.

The electrodes, which may be in the form of metallic foil, gauze, braid or wire, for example, tinsel wire, and may be of copper, aluminum, steel or other suitable metal, have hitherto been attached to the electrically conductive coating by means such as sewing on or into the coated lamina, stapling, weaving into the lamina, or embedding in the coating, for example, prior to curing where a curable composition is used. The actual method chosen in any particular case has depended on a variety of factors such as, for example, cost, convenience, the nature of the material and structure of the lamina and the nature of the electrically conducting coating. We have now found that in the cases where the electrically conducting film is a silicone elastomer that it is not always convenient or desirable to use any of these methods.

According to the present invention a process for the production of a heating element comprises, applying to a coating of an electrically conducting silicone elastomer coated on at least one side of a lamina at least two electrodes coated with an electrically conducting acrylic adhesive and applying pressure with or without heat, whereby said electrodes become firmly attached to the said coating, said electrodes being applied to the coating on the same side of the coated lamina.

The sole figure in the drawing illustrates the completed heating element with the parts identified with appropriate legends.

By the term "acrylic adhesive" as used herein we mean a synthetic adhesive based on and consisting esentially of a polyacrylate or polymethacrylate or a copolymer of such. The adhesive may, if desired, be applied to the electrodes in a solution in an organic solvent, for example, such as ethylene dichloride, trichloroethylene, acetone, methyl ethyl ketone or ethyl acetate. If an organic solvent solution is used it is desirable to remove the solvent after applying the adhesive to the electrode and before applying the electrode to the silicone elastomer since the solvent may adversely affect the elastomer. It is however, normally preferred to use the adhesive in the form of a latex aqueous dispersion.

The acrylic adhesive can be rendered conducting by the inclusion of particles of metal or carbon. In general carbon is preferred and the amount used will be governed largely by the conductivity desired in the adhesive and the strength of the bond given by the particular adhesive. The amounts of carbon used will not normally be less than 5 percent nor more than 20 percent by weight of the adhesive. Amounts of the order of from 8 to 12 percent are, in general preferred.

A wide variety of forms of electrode may be used as already stated. For many purposes it is however, preferred to use copper or aluminum in the form of foil.

The electrodes may be coated with the acrylic adhesive by any one of a wide variety of methods. Suitable methods include, for example, spraying, painting, dipping, use of transfer rolls and any of the other well known methods.

Any suitable method may be used to apply pressure or heat and pressure to the electrodes including, for example, passing the adhesive-coated electrodes and the coated lamina through a pair of nip rollers, pressing in a press and other well known methods.

The lamina used in our process may be in the form of a woven, knitted or felted fabric, preferably of asbestos. For some purposes, for example, for use in heatable wall coverings asbestos paper is preferred as the lamina.

The heating elements prepared by the process of our invention may be used for many different purposes. In fact they may be used as the heating element in any equipment which is to operate at temperatures below that at which the acrylic adhesive is softened by heat which is in general from about 100 to 120° C. Equipment in which the elements can be used includes, for example, ceiling heaters, wall heaters, heaters for industrial purposes and the like. For use in such equipment the heating elements will, of course, require to be treated in known manner, for example, by providing insulents and support where necessary.

Our invention is further illustrated by the following examples in which all parts and percentages are by weight.

EXAMPLE 1

10 parts of an acetylene black of surface area 25 m.²/g. (Shawinigan acetylene black) were dispersed by means of a high speed stirrer in 90 parts of an adhesive sold under the name Evo-tex SL807 by Evode Ltd. 40 parts of water containing 10 percent of a wetting agent being added to produce the consistency required for application. The resulting adhesive was applied by means of a conventional spray gun to one side of a fully annealed copper strip 0.5 inch wide by 0.003 inch thick after which the water was removed by means of warm air. Pieces of the treated copper strip of lengths 18 inches were then laid coated sides downwards, along two opposite sides of an 18 inch square of conducting silicone elastomer having a resistance of 350 ohms /square and coated on asbestos paper. A pressure of 250 p.s.i. was applied to the strips. An element made in this way when provided with electrical insulation is suitable for use in a 2 foot square ceiling tile and dissipates 44 watts when connected to an electrical supply of 120 volts. The contact resistance between the electrode and the elastomer was 67.5 ohms–cm.$^2$.

EXAMPLE 2

12 parts of an oil furnace black of average particle size 41 m$\mu$ (Sterling SO carbon black as sold by the Cabot Carbon Co.) were dispersed in 88 parts of an adhesive sold under the name CP102 by Commercial Plastics Ltd. The filled adhesive so obtained was applied to copper strip 0.5 inch wide and 0.001 inch thick by dipping and the coating dried by means of warm air. The treated copper strip was fed continuously between a coating of a conducting silicone coated with a suitable heat sealable adhesive and the asbestos paper and a polyvinyl chloride foil 20 inches wide coated with a suitable heat sealable adhesive and the assembly passed through a heated nip roller. The conducting silicone rubber coating has a resistance of 200 ohms/square. The resultant laminate was suitable for application to walls or ceiling and dissipated 13.5 watts/ft.$^2$ when connected to an electrical supply of 80 volts. The contact resistance between the electrode and the elastomer was 300 ohm–cm.$^2$.

EXAMPLE 3

The procedure of Example 1 was repeated except that the copper foil was replaced by 400 mesh woven copper gauze strip 0.5 inch wide (wire SWG49, opening 0.0013 inch). The contact resistance between the electrode and the elastomer was 390 ohm–cm.$^2$.

EXAMPLE 4

The procedure of Example 1 was repeated except that the acrylic adhesive used was National adhesive 201–4066 (sold by National Adhesive Ltd.) having dispersed therein 10 percent of the same acetylene black as was used in Example 1. The contact resistance between the electrode and the elastomer was 125 ohm–cm.$^2$.

EXAMPLE 5

The procedure of Example 1 was repeated using as acrylic adhesive equal parts of National adhesive 101–4066 and National adhesive 201–4066 having dispersed therein 10 percent of the same acetylene black. The contact resistance between electrodes and the elastomers was 128 ohm–cm.$^2$.

EXAMPLE 6

The procedure of Example 1 was repeated using as electrodes tin plated aluminium oil 0.5 inch wide and 0.03 inch thick. The contact resistance between the electrodes and the elastomer was 210 ohms–cm.$^2$.

EXAMPLE 7

The procedure of Example 1 was repeated using as electrodes 3/32 inch flat braided tinned copper wire. The contact resistance between the element and the elastomer was 54.2 ohm–cm.$^2$.

EXAMPLE 8

The procedure of Example 2 was repeated using as electrodes tin plated aluminum foil 0.5 inch wide and 0.03 inch thick. The contact resistance between the electrode and the elastomer was 230 ohm–cm.$^2$.

What we claim is:

1. A process for the production of an electric heating element comprising applying to a coating of an electrically conducting silicone elastomer coated on at least one side of an asbestos lamina at least two electrodes coated with an electrically conducting acrylic adhesive and applying pressure whereby said electrodes become firmly attached to the said coating, said electrodes being selected from metal foil, gauze, braid and wire applied to the coating on the same side of the lamina.

2. A process according to claim 1 wherein the electric conductivity of the acrylic adhesive is conferred by the incorporation therein from 5 to 20 percent by weight thereof of carbon particles.

3. A process according to claim 1 wherein the metal is selected from the group consisting of copper and aluminium.

References Cited

UNITED STATES PATENTS

| | | | |
|---|---|---|---|
| 2,781,277 | 2/1957 | Dwyer | 338—203 |
| 3,061,501 | 10/1962 | Dittman et al. | 219—543X |
| 3,221,145 | 11/1965 | Hager, Jr. | 219—543X |
| 3,387,248 | 6/1968 | Rees | 338—211 |

VERLIN R. PENDEGRASS, Primary Examiner